Patented Aug. 19, 1947

2,425,819

UNITED STATES PATENT OFFICE 2,425,819

TELEGRAPH DISTORTION MEASURING SYSTEM

James T. Neiswinter, South Orange, N. J., assignor to American Telephone and Telegraph Company, a corporation of New York Application January 1, 1943, Serial No. 471,082

9 Claims. (Cl. 178—69)

1

This invention relates to a method and means for measuring the characteristic distortion of a teletypewriter transmission circuit.

In the systems heretofore employed for the measurement of distortion in a teletypewriter circuit, it has been customary to transmit six teletypewriter characters, two of which determined the degree of bias of the circuit, and by using that determination in connection with the measurements of the other four characters, it was possible to determine the characteristic distortion of the circuit for those four characters. The present invention resides in the method and means for measuring the characteristic distortion of a teletypewriter circuit by transmitting merely four characters, namely, "blank," "T," "V," and "letters," each of which characters is transmitted first in the normal sequence of marks and spaces and then in the sequence in which those marks and spaces are inverted.

Figure 1:
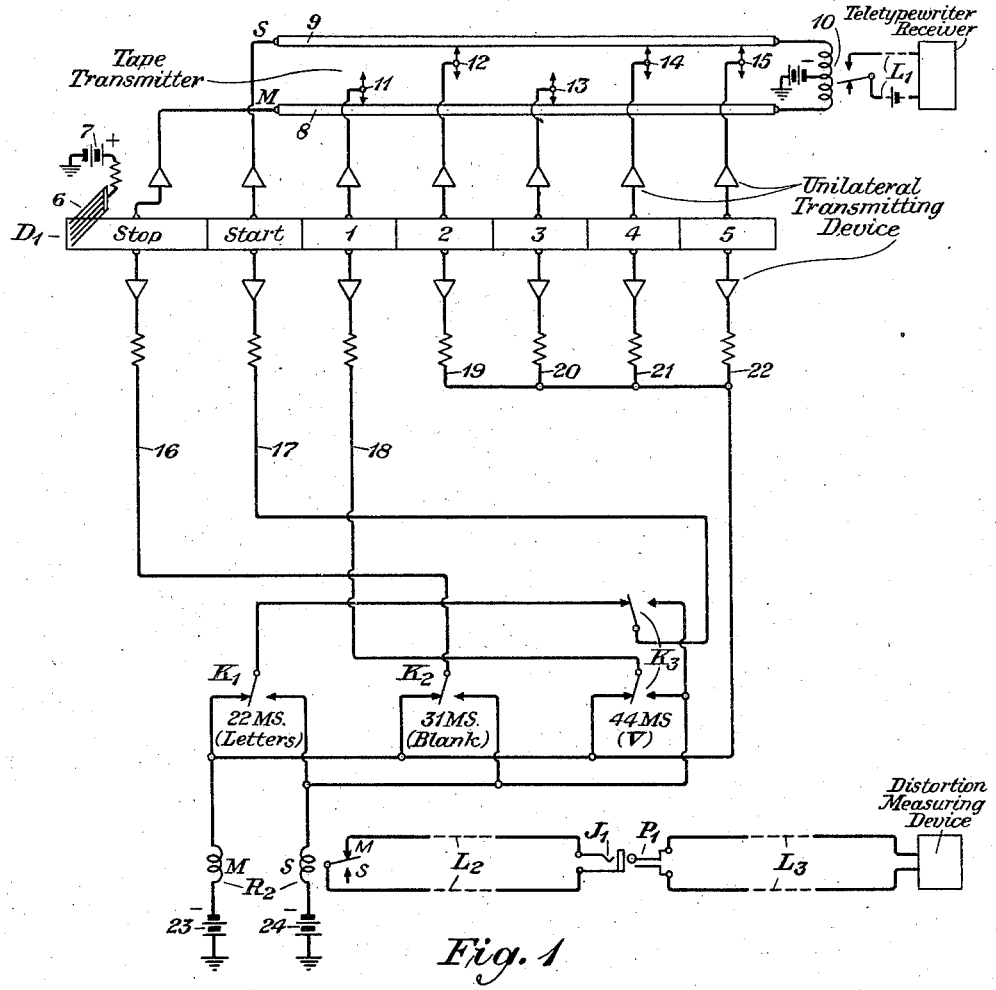
Figure 2:
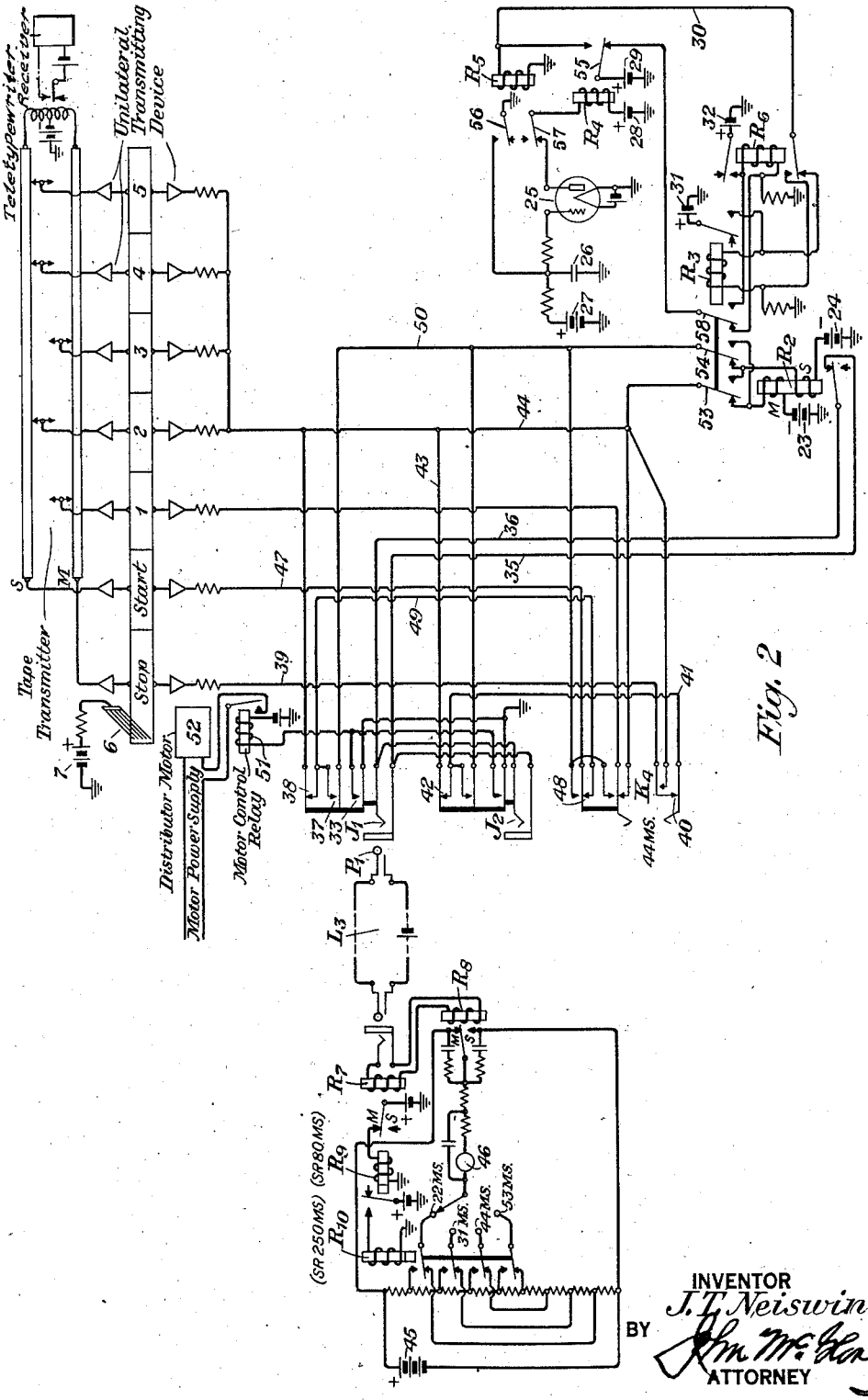

The invention will be more fully understood from the following description when read in connection with the attached drawing, of which Figure 1 shows schematically a simplified form of the invention; Fig. 1a is a graph of the characters transmitted for testing purposes; and Fig. 2 is an embodiment of the invention having means for automatically inverting the impulses of the character at the sending end and also for automatically adjusting the measuring device at the receiving end of the line for measuring the degree of distortion of both the normal and the inverted forms of a teletypewriter character.

In Fig. 1, $D_1$ represents a segmental distributor comprising stop and start segments and also character segments numbered 1 to 5 inclusive. That segmental device is normally in the form of a ring, but for the purpose of simplicity it is shown in the drawing in linear form. A brush 6, which is connected to the battery 7, sweeps over the segments of the distributor and thus applies a voltage to the circuits connected to the various segments. Since in teletypewriter practice the stop and the start impulses are normally marks and spaces, respectively, those segments are permanently connected to the mark and the space conductors, respectively, designated 8 and 9, which conductors form part of the well known automatic transmitter in which the transmitting relay is operated to its marking or spacing contacts, depending upon the positions of the contacts of the transmitter, which are positioned by automatic means for transmitting the desired characters.

As the brush moves over the start and stop seg-

2 ments, current will flow through the marking and then the spacing windings of relay 10, thereby causing the armature of that relay to close or open the line circuit $L_1$ for the transmission of marking and spacing impulses to the teletypewriter receiver at the distant end thereof. As the brush continues to move over segments 1 to 5, inclusive, current will flow through either the marking or spacing windings of relay 10, depending upon the position of the arms 11 to 15, inclusive. Each of the leads extending from the segments to the tape transmitter has therein a unilateral transmitting device represented symbolically by the open triangle, the purpose of which is to prevent the circuit of the tape transmitter from reacting upon the measuring circuit which is shown in the lower part of the figure. Those unilateral devices may be of any type that will permit current to pass in only one direction through those leads, such as a vacuum tube or a copper oxide rectifier.

Also connected to the segments of the distributor are a plurality of leads that extend either directly or through the contacts of the keys $K_1$, $K_2$ and $K_3$ to the windings of the relay $R_2$, the armature of which is connected to the circuit $L_2$ having therein the jack $J_1$, by means of which the line $L_3$, to be tested, is adapted to be connected to the testing circuit. Conductor 16 connects the stop segment to key $K_2$, which when operated to the left, connects that conductor to the marking winding of the relay $R_2$, and when thrown to the right connects it to the spacing winding of that relay. Conductor 17 connects the start segment to key $K_3$, which when operated to the left, connects that conductor to the marking winding of relay $R_2$ through the key $K_1$. Conductor 18 connects segment 1 to the lower armature of key $K_3$ which, when operated to the left effects a connection to the marking winding of relay $R_2$. When all those keys are operated to the right, the segments associated therewith will be connected to the spacing winding of relay $R_2$. Conductors 19 to 22, inclusive, effect a permanent connection of the segments 2 to 5, inclusive, to the marking winding of relay $R_2$. Each of the conductors 16 to 22, inclusive, has therein a unilateral transmitting device to prevent undesired reaction between the measuring circuit and the circuit of the tape transmitter shown at the top of Fig. 1. The circuit $L_3$, which is being tested, has connected therewith at its distant end a distortion measuring device such as that shown in Fig. 2.

With the keys $K_1$ to $K_3$, inclusive, in the position shown in the figure, all of the segments of the distributor are connected to the marking winding of relay $R_2$ and, in consequence, the circuit $L_2$ remains closed and no impulses will be transmitted over the line $L_3$. Now let it be assumed that it is desired to transmit the character "letters" which, as shown in Fig. 1a, consists of a marking impulse, a spacing impulse and five more marking impulses. Such transmission is effected by operating the key $K_1$ to the right. As the brush moves over the stop segment, current will flow from the battery 7, through the brush and segment, thence over a circuit that includes conductor 16, the left-hand contact of key $K_2$, the marking winding of relay $R_2$ and battery 23 to ground. The armature of that relay will remain on its marking contact. When the brush moves onto the starting segment, current will flow over conductor 17, the upper left-hand contact of key $K_3$, right-hand contact of key $K_1$, and through the spacing winding and battery 24 to ground, thereby causing the armature of relay $R_2$ to move to its spacing contact and open the circuit $L_2$ and also circuit $L_3$ connected therewith. Thus a spacing impulse will be transmitted to the measuring device. When the brush moves over segment 1, current will flow through conductor 18, lower left-hand contact of key $K_3$, the marking winding of relay $R_2$ and the battery 23 to ground, thus causing the armature of that relay to move to its marking contact. The armature will remain on its marking contact throughout the movement of the brush over segments 2 to 5, inclusive, since those segments are all connected to the marking winding of relay $R_2$. The circuit $L_2$ and also the circuit $L_3$ are closed throughout the transmission of the marking impulse and will be opened only for the transmission of the single spacing impulse which is 22 milliseconds long. It is important to point out that the measurement of a circuit using only the 22-millisecond signal is sufficient to equalize and maintain at least 90 per cent of the circuits in the plant of the inventor's assignee.

With the key $K_2$ operated to the right, key $K_1$ having been restored to its left-hand position, there would be transmitted over the line $L_2$ a 31-millisecond spacing impulse followed by an unbroken sequence of marking impulses which is the inverse of the character "blank" as shown in Fig. 1a. In like manner, by operating key $K_3$ so as to close both the upper and lower right-hand contacts there would be transmitted over the line a 44-millisecond space followed by a sequence of marking impulse constituting the character "V." By operating both keys $K_1$ and $K_2$ to the right, both the stop and start segments will be connected to the spacing winding of relay $R_2$ and a signal having a 53-millisecond space would be transmitted. It is important to point out that by the use of the unilateral transmitting devices shown in the several leads connected to the segments of the distributor, it is practicable to employ such a distributor simultaneously for the transmission of test sentences over the line $L_1$, and for the transmission of measuring impulses over another circuit, such as $L_3$.

In the arrangement shown in Fig. 2 in which the same reference numerals have been employed to indicate parts similar to those shown in Fig. 1, the apparatus for automatically inverting the signals at the sending end and for automatically adjusting the receiving apparatus for such inverted signals is shown in detail. In Fig. 2 the jack $J_1$ provides means for connecting to the testing circuit the line $L_3$ for the transmission of 22-millisecond signals thereover, both in their normal form and in their inverted form. The jack $J_2$ provides similar means for the transmission of 31-millisecond signals and the key $K_4$ provides means for transmitting 44-millisecond signals. For the transmission of 53-millisecond signals the plug $P_1$ is inserted in the jack $J_1$ and at the same time a dummy plug is inserted in the jack $J_2$ for the purpose of closing the spring contacts thereof. Relay $R_2$ serves to open and close any circuit that may be connected to the jacks $J_1$ or $J_2$. The relay $R_3$ automatically inverts the impulses that would be transmitted over the line $L_3$, that is to say, a given teletype character would be transmitted first in its normal form and then in its inverted form. That inversion is effected by the operation of the circuit shown at the right-hand side of the drawing, which circuit has therein a vacuum tube 25, a condenser 26, and a battery 27 which control the potential applied to the grid of the tube. $R_4$ and $R_5$ are relays which respond to the operation of the tube 25, and $R_3$ and $R_6$ are relays which respond to the operation of relays $R_4$ and $R_5$. The operation of relay $R_3$ through two of its armatures, 53 and 54, controls the connection of the distributor segments to the marking or the spacing windings of relay $R_2$ and that is done automatically in the following manner. When the condenser 26 has received a sufficient potential, say 70 volts from the 130-volt source 27, the tube 25 will be conductive and current will flow from the source 28, through relay $R_4$ and the plate-filament circuit of the tube, thereby operating relay $R_4$ and causing its armature 55 to touch its upper contact. Current from the battery 29 will then flow through the winding of relay $R_5$ and will cause the upward movement of the armatures of that relay, the upper one, 56, applying ground to the condenser 26 and the lower one, 57, opening the circuit of relay $R_4$. Relay $R_4$ is of the slow release type and is so timed that before releasing, current will flow from the source 29, over conductor 30, lower outer contact of relay $R_6$ and the winding of relay $R_3$, thereby causing the operation of the latter relay and moving all of its armatures to its right-hand contacts. Relay $R_3$ will lock up by current from the source 31. When the armatures of relay $R_3$ move to the right-hand contacts and relay $R_4$ has released so that its armature 55 touches its lower contact, current will flow from battery 29, through the armature 58 of relay $R_3$ and the winding of relay $R_6$ to ground causing the operation of the latter relay, which will be locked by current from the battery 32. The release of relay $R_4$ releases relay $R_5$, thereby removing the ground from condenser 26 and thus permitting the voltage to again build up on that condenser and to effect the subsequent operation of the tube 25, and, in turn, the operation of relay $R_4$. Since at this instant relay $R_6$ is operated and its armatures are on the inner contacts, the battery 29, of say 130 volts, will then be connected through the lower inner contact of relay $R_6$ to a point between the winding of relay $R_3$ and ground, the effect of which is to shunt the winding of relay $R_3$ and to effect the release of the latter relay, thus permitting its armatures to move to the left. Upon the next operation of relay $R_5$, relay $R_4$ will be released and the battery 29, of 130 volts, will be connected through armature 58 and its left-hand contact of relay $R_3$ to a point between the winding of relay $R_6$ and ground, the effect of which is to shunt that winding and to release relay $R_6$. The system of relays is now in the condition in which it was as initially described herein, so that upon the occurrence of the next discharge through the tube 25 the sequence of operations herein described will take place again, thereby establishing a condition for the transmission of the teletypewriter impulses in the normal way to which they appear in their respective characters.

The manner in which the system operates for the transmission of a testing character is as follows: Let it be assumed that the plug $P_1$ has been inserted in the jack $J_1$ for the transmission of an impulse having a length of 22 milliseconds. The insertion of the plug into the jack closes contact 33, and thereby closes the circuit to the motor control relay 51 starting the distributor motor 52, thus causing the brush 6 to sweep over the segments of the distributor. In the case illustrated these segments are so proportioned and the speed of the brush is such that the latter remains on each segment for 22 milliseconds with the exception of the "stop" segment. The latter is longer and the brush requires 31 milliseconds to traverse it. The insertion of the said plug into the jack connects the conductors of the line $L_3$ to the conductors 35 and 36 that extend to the armature and the upper contact of relay $R_2$. Contact 37 will also be closed and contact 38 will be opened. As the brush moves over the stop segment, current will flow from the source 7 through the brush and segment, thence over conductor 39, through contact 40, conductor 41, contact 42, conductors 43 and 44, the left-hand contact 53 of relay $R_3$, a winding of relay $R_2$ and battery 23 to ground. Since the flow of current is through the marking winding, the armature of relay $R_2$ will remain upon its marking contact and the circuit of line $L_3$ will remain closed, thereby sending a marking signal over the line $L_3$.

As the brush moves on to the start segment of the distributor, current will flow from battery 7, over conductor 47, thence through contact 48, conductor 49, contact 37, conductor 50, armature 54 and its left-hand contact of relay $R_3$ to the spacing winding of relay $R_2$ causing the armature of the latter relay to open its circuit and thereby to open the circuit of the line $L_3$, transmitting a spacing signal to that line.

When the brush reaches the No. 1 segment of the distributor a path may again be traced for current from battery 7 through the marking winding of relay $R_2$ and the armature of that relay returns to its upper contact transmitting a marking signal to the line $L_3$. Similarly, while the distributor brush is on segments 2, 3, 4 and 5 it may be seen that current will be in the marking winding of relay $R_2$ and a marking signal will continue to be transmitted to the line $L_3$.

The distributor brush runs continuously over the circular distributor face as long as plug $P_1$ is in jack $J_1$. Therefore, as long as relay $R_3$ remains in the condition shown, a repeated signal consisting of a 22-millisecond open circuit or spacing signal alternating with a 141-millisecond closed circuit or marking signal will be transmitted to the line $L_3$.

As was previously described, however, the armatures of relay $R_3$ are switched from one set of contacts to the other at intervals determined by the timing circuit represented by battery 27, condenser 26, vacuum tube 25 and the associated resistances and relays. When the armatures of relay $R_3$ are moved to their right-hand contacts by this timing circuit, the connections to the marking and spacing windings of relay $R_2$ are interchanged, and the signal transmitted to the line is then inverted from that previously discussed and will consist of a 22-millisecond marking signal alternating with a 141-millisecond spacing signal.

Other signals may also be obtained from the arrangement shown in Fig. 2. If plug $P_1$ is inserted in jack $J_2$ it may be seen that a signal consisting of a 31-millisecond space alternating with 132-millisecond mark or vice versa will be transmitted to line $L_3$. With the plug $P_1$ in either jack and the 44 MS key $K_4$ operated, signals having a 44-millisecond space and 119-millisecond mark or vice versa will be obtained. With plug $P_1$ in either jack, a dummy plug in the other jack, and key $K_4$ unoperated, 53-millisecond spacing signals and 110-millisecond marks or vice versa will be obtained.

At the other end of the line $L_3$, the distortion of which it is desired to measure, is a transmission measuring device as shown at the left in Figure 2. Relay $R_8$ of this device is a telegraph receiving relay which is operated to its marking contact M when the received signal is marking and to its spacing contact S when the received signal is spacing. To the armature and contacts of this relay there is connected a well-known bridge type of circuit with a center-zero meter arranged to indicate the distortion in the received telegraph signals. As a part of this bridge circuit there is a potentiometer connected across battery 45. The taps on this potentiometer are so proportioned that if the potentiometer dial is set, for example, on the "22 MS" tap and relay $R_{10}$ is on its lower contacts, the meter will read zero when receiving repeated 22-millisecond spacing signals alternating with 141-millisecond marking signals, provided these signals are not distorted. Any systematic distortion of these signals, however, will be indicated directly on the meter. Similarly, if the potentiometer dial is on the "31 MS" tap, the meter will read zero for undistorted signals consisting of a spacing impulse 31 milliseconds long alternated with a marking impulse 132 milliseconds long and the meter will read directly any systematic distortion in these signals. A corresponding measurement can be made on 44-millisecond spacing and 119-millisecond marking signals with the potentiometer on the "44 MS" tap, and on 53-millisecond spacing and 110-millisecond marking signals with the potentiometer on the "53 MS" tap. Furthermore, if the relay $R_{10}$ is operated so that its armatures are on their upper contacts, the meter will indicate correctly distortion of signals which are the reverse of the above, for example, a 22-millisecond mark alternated with a 141-millisecond space, a 31-millisecond mark alternated with a 132-millisecond space, a 44-millisecond mark with 119-millisecond space, or a 53-millisecond mark with 110-millisecond space, provided the potentiometer dial is set on the appropriate tap.

Since as described above, the signals sent into the line $L_3$ by relay $R_2$ are changed periodically from a short space and a long mark to the opposite, it is necessary to operate relay $R_{10}$ at the time when the change is made in the sending circuit in order that the meter 46 may continue to read distortion correctly. This turnover is accomplished by relays $R_7$, $R_9$ and $R_{10}$ automatically in the following manner. Relay $R_7$ operates in accordance with the marks and spaces of the received signals, its contact being made for a marking signal. Relay R9 is of the slow release type and releases only on spacing signals of 80 milliseconds or more. When the signal being received consists of a short space and long mark, therefore, relay R9 will not release and the circuit through the winding of relay R10 which is connected to the back contact of relay R9 remains open. The armature of relay R10, therefore, remain on their lower contacts connecting the meter circuit to the lower portion of the potentiometer which is correct when signals having short spacing signals and long marks are being received.

When receiving the inverted signals consisting of short marks followed by longer spaces, the spacing interval is greater than the 80 milliseconds required for relay R9 to release and it, therefore, closes the circuit through the winding of relay R10 once during each received test character. Relay R10 is thereby operated transferring the connection from the meter to the upper portion of the potentiometer, which is the correct condition for measuring on signals having short marks and long spaces. Relay R10 is also of the slow release type, requiring about 250 milliseconds for its armatures to release. It, therefore, remains operated continuously as long as signals having short marking intervals and long spaces are being received.

When the received signals again reverse so that the spacing interval becomes less than 80 milliseconds, relay R9 again remains operated and relay R10 is released, restoring connections from the meter to the lower part of the potentiometer.

It is seen, therefore, that, by means of the device at the receiving end of the line L3, the potentiometer connection will be automatically changed to agree with the nature of the incoming signal, namely, whether it is in its normal or its inverted form.

While this invention has been disclosed as embodied in a particular form and arrangement of parts, it is not so limited but is capable of embodiment in other forms without departing from the spirit and scope of the appended claims.

What is claimed is:

1. In a teletypewriter system, the combination with a segmental rotary distributor of an automatic transmitter connected to the segments of the said distributor, a testing circuit also connected to the segments of the said distributor, the connection between the said tape transmitter and the distributor having a unilateral transmitting device therein to permit current to flow only toward the said transmitter and the connection between the said testing circuit and the distributor also having a unilateral device therein to permit the flow of current toward the said testing circuit thereby preventing reaction between the latter circuit and the automatic transmitter.

2. In a teletypewriter system, the combination with a segmental rotary distributor having a source of voltage connected thereto, of a line to which the impulses constituting a selected teletypewriter character may be applied, a relay responsive to the voltage applied by the said distributor to open and close the said line for the transmission of spacing and marking impulses, a second relay arranged to reverse the connections between said distributor and said first mentioned relay to invert the impulses of the said selected character, a timing circuit to automatically operate the said second relay so as to invert each previously transmitted teletypewriter character.

3. The device defined by claim 2 further characterized by the inclusion of measuring means connected to the line at its distant end to indicate the magnitude of distortion of the received characters, the said measuring means having means controlled by the transmitted impulses of a signal character to render the measuring means capable of measuring both the normal and inverted characters.

4. In a teletypewriter system, the combination with a segmental rotary distributor having a brush and a source of potential associated therewith, of a line relay having marking and spacing windings connected to the segments of the said distributor, a line whose transmission characteristics are to be tested, a plurality of means to connect the said line to the armature and contacts of the said relay, each of the said connecting means being so arranged as to determine the mode of connection of the segments of the said distributor to the windings of the said relay and means connected to the distant end of the said line and controlled by the transmitted impulses of a signal character to measure the degree of distortion of the character impulses transmitted thereover.

5. The device defined by claim 4 further characterized by a second relay to invert the impulses of the character normally transmitted and a vacuum tube timing circuit to operate the said second relay at suitable intervals.

6. Means for testing a teletypewriter line circuit for bias and characteristic distortion comprising, in combination, a segmental rotary distributor having a brush and a source of potential associated therewith, a line-relay having marking and spacing windings connected to the segments of the said distributor, a line whose transmission characteristics are to be tested, a plurality of means to connect the said line to the armature and contacts of said relay, each of the said connecting means being so arranged as to determine the mode of connection of the segments of the said distributor to the windings of said relay, means connected to the distant end of the said line and controlled by the transmitted impulses of a signal character to measure the degree of distortion of the impulses transmitted thereover, means to invert the impulses of the character normally transmitted, the said means including a second relay to reverse the connections of the said distributor segments to the windings of the line relay and a vacuum tube timing circuit to operate the said second relay at predetermined intervals, and means associated with the said measuring means at the distant end of the line and controlled by the transmitted impulses to alter the circuit connections thereat, whereby the measuring circuit will properly measure the distortion of the impulses in both their normal and inverted positions.

7. In a teletypewriter system, the combination with a segmental rotary distributor of a tape transmitter, each of the contactors of which is connected by a lead to a segment of the said distributor, a line to which the said transmitter is connected, a second line, the transmission characteristics of which are to be tested, a line relay having a marking and a spacing winding adapted to apply impulses to the said second line, the said marking and spacing windings being connected to the several segments of the distributor, and means inserted in all of said connections to the said distributor to prevent reaction between the impulses of the test signals and those impulses applied by the said transmitter to the first mentioned line.

8. The invention defined by claim 7 further characterized by the inclusion of means to automatically reverse the connections between the segments of said distributor and the said line relay to effect the inversion of the impulses of the normal signal character being transmitted for testing the said second line.

9. In a teletypewriter system, the combination with a segmental rotary distributor of a tape transmitter connected by a plurality of leads to the segments of the distributor and adapted to transmit teletypewriter signals to a line, each of the said leads including a one-way transmitting device directed toward the transmitter, a testing circuit also connected to the said distributor by a plurality of leads, each of which includes a one-way transmitting device directed toward the said testing circuit, the said circuit including a line relay adapted to transmit teletypewriter impulses to a second line to be tested for its transmission characteristics, the windings of the said line relay being connected to the segments of the said distributor, a second relay controlled by an electronic timing circuit and adapted to periodically reverse the connections between the said distributor and said line relay windings to effect the transmittal over the said second line of the inverse of the normal teletypewriter character employed for testing.

JAMES T. NEISWINTER.

REFERENCES CITED

The following references are of record in the file of this patent:

UNITED STATES PATENTS

| Number | Name | Date |
|---|---|---|
| 2,221,129 | Cowan | Nov. 12, 1940 |
| 1,735,943 | Watson | Nov. 19, 1929 |
| 1,672,633 | Cory | May 10, 1937 |
| 1,555,041 | Vernam | Sept. 29, 1935 |
| 2,276,533 | Wilkerson | Mar. 17, 1942 |
| 2,353,584 | Potts | July 11, 1944 |